Jan. 10, 1928.  1,656,014
A. L. PUTNAM
METHOD OF FORMING DEMOUNTABLE RIM SECURING MEMBERS FOR VEHICLE WHEELS
Filed April 28, 1924
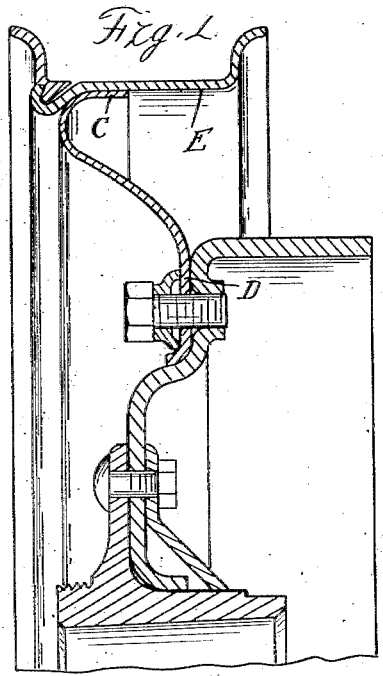
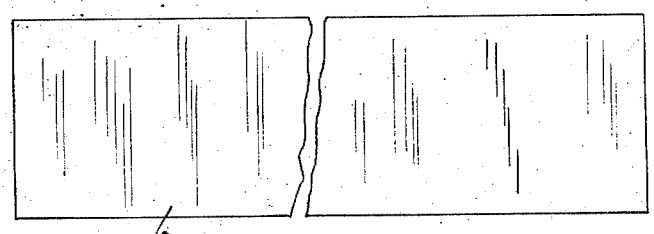
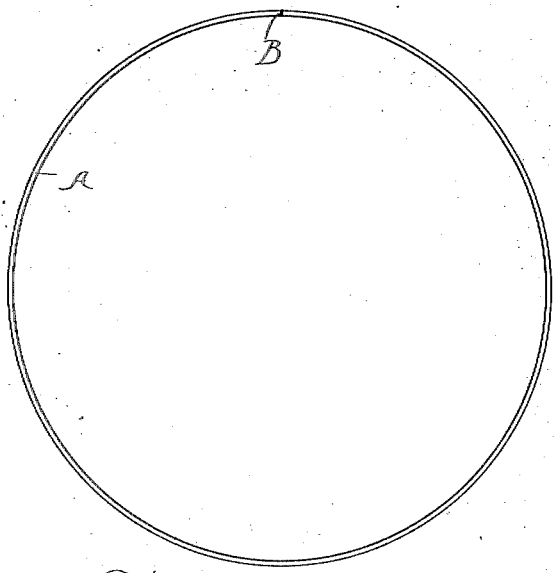
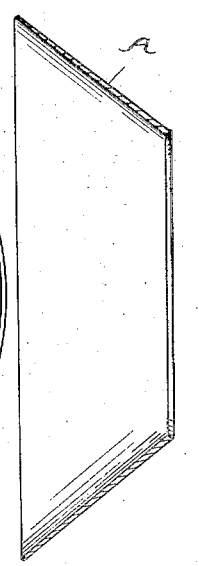
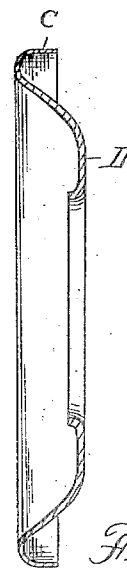
Inventor
Alden L. Putnam
By Whittemore Hulbert Whittemore
Belknap    Attorneys Patented Jan. 10, 1928.

1,656,014

UNITED STATES PATENT OFFICE.

ALDEN L. PUTNAM, OF LANSING, MICHIGAN, ASSIGNOR, BY MESNE ASSIGNMENTS, TO MOTOR WHEEL CORPORATION, OF LANSING, MICHIGAN, A CORPORATION OF MICHIGAN.

METHOD OF FORMING DEMOUNTABLE-RIM-SECURING MEMBERS FOR VEHICLE WHEELS.

Application filed April 28, 1924. Serial No. 709,636.

The invention relates to the manufacture of reversely dished rings particularly designed for attaching tire rims to the brake drums of vehicle wheels, and the invention consists in the method of manufacture as hereinafter set forth.

In the drawings:

Figure 1 is a section through a vehicle wheel to which the reversely dished ring is applied;

Figure 2 is a plan view of the flat sheet metal blank for forming the ring;

Figures 3, 4 and 5 show the successive steps of forming said blank into the fashioned ring.

In carrying out my improved method a strip of sheet metal A of proper width and length is bent into cylindrical form and the ends joined by welding, as indicated at B. The ring thus formed is then subjected to an upsetting pressure in dies so as to contract the circumference of one end of the ring and to form thereof a truncated cone. This upsetting operation will increase the gauge of the metal so as to produce an outwardly tapering cross section. The conical blank is then subjected to further pressing, which turns the outer edge to form a cylindrical flange C and the inner edge to form a flange in a plane perpendicular to the axis of the cylinder. The latter flange is then perforated at spaced points to provide for attachment of the same to the body of the wheel.

In use the ring has a cylindrical flange C secured to a tire engaging rim E, while the flange D is secured to the brake drum or other body portion of the wheel.

What I claim as my invention is:

1. The method of forming fashioned rings for vehicle wheels comprising bending a flat strip into cylindrical form, integrating the ends by welding, upsetting the metal to contract one end of said cylinder and to form thereof a truncated cone, and pressing said truncated cone into its final form.

2. The method of forming fashioned rings for vehicle wheels comprising the bending of a sheet metal strip into cylindrical form, integrating the adjacent ends of said strip, upsetting one end of said cylinder to contract the circumference thereof and to form a truncated cone, reversely bending the outer edge of said cone to form a return-bent cylindrical flange and pressing the inner edge into a plane perpendicular to the axis of said cylinder.

3. The method of forming fashioned rings for vehicle wheels comprising the bending of a sheet metal strip into cylindrical form, integrating the adjacent ends of said strip, circumferentially contracting one end of said cylinder to form a truncated cone, and pressing said cone to form a return-bent outer portion, and an inner portion lying in a plane perpendicular to the axis of the cylinder.

4. The method of forming fashioned rings for vehicle wheels which consists in bending a flat strip into cylindrical form with a diameter equal to the greatest peripheral diameter of the finished article, integrating the ends by welding; upsetting the metal to contract one end of said cylinder, to convert the same into a truncated cone and to increase the gage of the metal toward the inner periphery, and pressing said truncated cone into its final form.

In testimony whereof I affix my signature.

ALDEN L. PUTNAM.